Aug. 8, 1961     M. S. SCOLAMIERO     2,995,179
COMPOSITION TILE AND METHOD OF MAKING THE SAME
Filed May 13, 1958

INVENTOR.
MARIO S. SCOLAMIERO
BY
Edward J. Willey
ATTORNEY

2,995,179
COMPOSITION TILE AND METHOD OF MAKING THE SAME

Mario S. Scolamiero, Newark, N.J., assignor to The Patent and Licensing Corporation, New York, N.Y., a corporation of Massachusetts
Filed May 13, 1958, Ser. No. 735,013
6 Claims. (Cl. 154—26)

This invention relates to composition tile and the method of making the same and more particularly to the production of a floor tile having a random pattern of variegated colored particles therein.

Composition tiles of the so-called asphalt or plastic type are usually made with a resin, a plasticizer for the resin, and a filler. The filler which may be asbestos, limestone or other mineral filler, usually exceeds 50% by weight of the tile. The resin may be any of a number of synthetic resins or may include rosin, rosin pitch or rosin derivatives. The tiles which are known as asphalt tiles may contain asphalt as the resin but sometimes do not contain any asphalt.

Substantially all of the tile manufactured commercially contains colored pigment and it has been customary to marbleize the pigmented material. The marbleizing has been accomplished by mixing chips of previously compounded tile with a pigmented base composition which is different in color than the chips. The whole mix is heated and agitated and the mass is then calendered whereby the added chips form streaks in the base material which have the appearance of marbleizing.

It is an object of the present invention to provide a composition tile having particles distributed in a random pattern therein of colors different from the color of the base material and having a three-dimensional appearance. The use of the term "particles" is intended to distinguish from the smears or streaks of different colored material which lend a marbleizing appearance.

It is a further object of the present invention to provide a composition tile having different colored particles which give a three-dimensional appearance.

It is a further object of the present invention to provide a composition tile having different colored particles distributed in a random pattern therein wherein the particles are arranged in a freely random manner without a directional trend and having a three-dimensional appearance.

It is a further object of the present invention to provide a composition tile having different colored particles distributed therein wherein the particles are an integral part of the tile and have a three-dimensional appearance.

It is a further object of the present invention to provide a composition tile having different colored particles distributed therein wherein the surface of the tile is completely filled and contains no pockmarks and have a three-dimensional appearance.

These and other objects are attained by the present invention which will be more readily understood by reference to the drawings and specific examples but it will be understood that variations and substitutions may be made within the scope of the claims.

Figure 1:
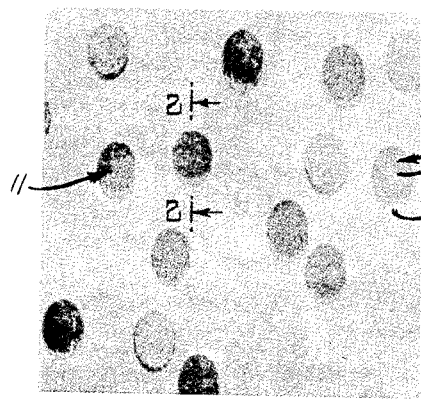
FIG. 1 is a top plan view of a square piece of tile.
Figure 2:
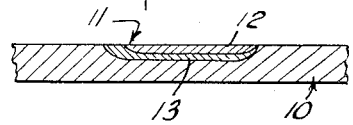
FIG. 2 is a segmental cross-sectional view of the tile of FIG. 1 taken at the lines 2—2 in enlarged scale.
Figure 4:
FIG. 4 is a top plan view of a square piece of tile with another alternative design.
Figure 5:
FIG. 5 is a top plan view of a square piece of another alternative tile.

The drawings show, for example, at FIGS. 1 and 2, a base 10 wherein are embedded laminated particles 11 having one colored surface 12 and another colored surface 13 under the colored surface 12 but displaced slightly therefrom as will be understood with reference to the drawings. At FIG. 4 the base 10 has embedded therein particles 14 which in this case are square instead of the round particles shown at FIGS. 1 and 2. At FIG. 4 is shown the tile base 10 in which are embedded particles 15 which are elongated and generally parallel. At FIG. 5 is shown the base tile 10 in which are embedded particles 16 which are elongated but not in parallel relationship such that they give a jackstraw effect. It will be noted in all the figures that the surface of the tile is smooth and that the particles are completely embedded in the surface or are in effect an integral part of the tile.

The new tile involves the preparation of a plurality of different colored composition sheets of tile stock which may, for example, be about 0.025" to about 0.040" in thickness and laminating these sheets together under heat and pressure into a single sheet. This sheet is then cut into the shapes desired or chipped in a hammer mill or the like. In some cases the particles are of a predetermined size formulation as previously cut and are distributed in the surface in a parallel random pattern.

In general, the proportions of resin, plasticizer and filler are those commonly used in the production of floor tiles. The filler which may, for example, be asbestos, limestone or both, or other mineral filler, generally constitutes from 60–80% by weight of the tile and preferably from 65–75% by weight of the tile. Pigments used to produce the desired color effect include, for example, titanium oxide, carbon black, iron oxide, chromium oxide, phthalocyanine, etc. For purposes of proportioning these may be considered a part of the filler since it will be obvious that more or less pigment is used depending upon the degree or intensity of the color which it is desired to obtain. These factors are not peculiar to this invention but are well known in the production of plastic tile. The binder portion of the tile generally contains a synthetic resin such as coumarone-indene, styrene or both, but may contain any of a wide variety of other resins including rosin, vinyl chloride, vinyl acetate, etc. The proportions of plasticizer together with resin make up the balance of the tile, or, in other words, from 20–40% by weight of the tile and preferably 25–35%. The relation of plasticizer to resin is generally from 50–80% resin and from 50–20% plasticizer based on the combined plasticizer-resin.

Example

Tile was made up according to the following formula:

| | Pounds |
|---|---|
| Coumarone-indene resin | 44 |
| Tall oil pitch | 11 |
| Mineral oil | 11 |
| Polystyrene resin scrap | 6 |
| 7R Asbestos | 108 |
| Ground limestone (80 mesh and finer) | 161 |
| Titanium dioxide | 9 |

All of the ingredients were placed in an internal mixer having an intense shearing action such as the mixer well known as the Banbury mixer. Preferably the mixer is first heated by the use of steam in the jacket of the mixer. After a few minutes all of the ingredients are thoroughly mixed and the charge is removed from the Banbury and dropped on to a sheeting mill where it is masticated on hot rolls. The plastic mass is then cut off the hot rolls and conveyed through hot calender rolls adjusted so that the thickness of the sheet issuing from the calender rolls is between 0.002" and 0.006" thicker than the ultimate thickness desired in the final product, which is usually 0.125".

After the hot calender rolls the previously cut circular particles of different colors are sprinkled on the surface of the sheet from a Syntron vibrator. These particles are made from laminated material of an identical composition but of different base colors.

Immediately after the sprinkling on of the various colored particles the sheet passes under an embedding roll which causes the particles to be pressed into the surface of the sheet. The sheet then continued on a conveyer under a bank of infra-red lamps. The infra-red lamps heat both the surface of the sheet as well as the newly embedded particles. The sheet is then passed through warm calender rolls which press it to the final product thickness. After the calender rolls the sheet is cut into tiles and packed for shipment.

While coumarone-indene was the resin used in the above example, it will be understood that any of the resins known to be useful for the manufacture of plastic tile may be used including petroleum resins, polystyrene, rosin, rosin derivatives, asphalt vinyl chloride, vinyl acetate, phenolic, etc. In order to obtain proper resiliency and to limit cold flow and tack, the resins may be used in admixture and usually contain plasticizers suitable for the particular resin used. As is well known to the art, various fillers may be used but the filler is usually partially fibrous and usually contains asbestos. As previously mentioned, the pigments may be of any type commonly used for plastic tiles and are usually inorganic with the exception of the phthalocyanine pigments which are organic.

The equipment used to produce the tile is that commonly used for the purpose with the exception of the device for sprinkling the particles which may be the Syntron vibrator mentioned in the example, or may be a fluted feed roll applicator, for example. The bank of infra-red heaters is also peculiar to the present process. Instead of infra-red heaters gas ray burners may be used. They should be of a number and location sufficient to quickly heat only the surface of the sheet including the colored particles sufficient to permit the slight offset but should not be so intense as to melt the surface or the particles as this would cause a smearing of the particles.

Instead of the Banbury mixer used in the above example the dry ingredients may be first mixed on an agitator or tumbler type mixer to which the mineral oil may be added and the resin ingredients together with the pitch may be mixed on a hot roll mill until a plastic mass is formed, after which the dry mixture is gradually added until all of the material forms a plastic mass. The process may be operated as a batch process or it may be operated continuously with conveyors moving the material from one step to the next.

The tile produced in accordance with the example contained colored particles in a truly random, non-directional pattern as illustrated in the drawings at FIG. 1. The surface of the tile was perfectly smooth with no "pockmarks" adjacent the particles. By the use of the heating step between the two sets of calender rolls, by the use of the controlled particle size and by the use of particles of substantially the same composition as the base material, the particles are an integral part of the tile and thus are not removed in use.

In the example a bank of heaters was utilized just after sprinkling on the various colored particles. It may sometimes be desirable to use a second bank of heaters just prior to sprinkling on the various colored particles although this is not essential if the material is sufficiently hot as it comes from the calender rolls.

Figure 3:
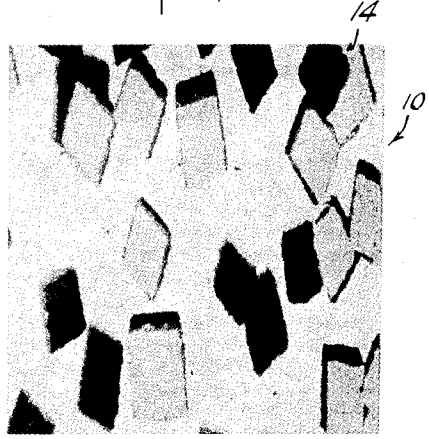
FIG. 3 is a top plan view of a square piece of tile with a design alternative to the one shown at FIG. 1.

In FIG. 3 the laminated tile sheets are cut in squares, applied in a random pattern and pressed to cause a slight offset, as illustrated. At FIG. 4 the colored laminated sheet is cut into elongated strips. In this case the tile surface is allowed to be a little more heated than in the figures and consequently there is a little more tendency to marbleize.

At FIG. 5 the laminated sheet is cut into elongated rectangular strips which are dropped in a random pattern. As will be seen in this figure, in some cases one color will be uppermost and in other cases another color.

I claim:

1. An improved composition tile comprising a base of filled plastic mass of one color having in the surface thereof integral particles of a plastic material having substantially the same hardness as the base material and made from a laminated sheet of at least two different colors different from the color of the base material wherein a substantial portion of the base appears on the surface and wherein the said integral particles substantially maintain their original shape and are not smeared or marbleized and whereby the said particles have a three dimensional visual effect.

2. An improved composition tile comprising a base of filled plastic mass of one color having in the surface thereof a random pattern of discs comprising a plurality of laminated layers of plastic material having substantially the same hardness as the base material and each lamination being of a color different from the base material wherein a substantial portion of the base appears on the surface and wherein the integral discs substantially maintain their original shape and are not smeared or marbleized and whereby the said particles have a three dimensional visual effect.

3. An improved composition tile comprising a base of filled plastic material of one color having in the surface thereof integral square particles of a plastic material having substantially the same hardness as the base thereof and made from a laminated sheet of at least two different colors different from the color of the base material wherein a substantial portion of the base appears on the surface and wherein the said integral particles substantially maintain their original shape and are not smeared or marbleized and whereby the said particles have a three dimensional visual effect.

4. An improved composition tile comprising a base of filled plastic mass of one color having in the surface thereof integral elongated particles of a plastic material having substantially the same hardness as the base material and made from a laminated sheet of at least two different colors different from the color of the base material, said particles arranged in a random pattern wherein a substantial portion of the base appears on the surface and wherein the said integral particles substantially maintain their original shape and are not smeared or marbleized and whereby the said particles have a three dimensional visual effect.

5. An improved composition tile comprising a base of filled plastic mass of one color having in the surface thereof integral elongated particles of a plastic material having substantially the same hardness as the base material and made from a laminated sheet of at least two different colors different from the color of the base material, said particles arranged in a substantially parallel directional pattern wherein a substantial portion of the base appears on the surface and wherein the said integral particles substantially maintain their original shape and are not smeared or marbleized and whereby the said particles have a three dimensional visual effect.

6. A process for producing a composition floor tile having a design therein simulating a three dimensional effect comprising a base of a filled plastic mass of one color having in the surface thereof integral particles of a plastic material having substantially the same hardness as the base material and made from a laminated sheet of at least two different colors different from the color of the base material wherein a substantial portion of the base appears on the surface and wherein the said particles substantially maintain their original shape and are not smeared or marbleized, which process comprises sheeting the said base with filled plastic mass, hot calendering the base, applying the said particles to the surface of the base, imbedding the particles in the base, heating the base with the imbedded particles therein by means of infra red lamps and subsequently warm calendering the base with the particles therein.

References Cited in the file of this patent

UNITED STATES PATENTS

| | | |
|---|---|---|
| 2,083,201 | Poppe | June 8, 1937 |
| 2,689,981 | McCarthy | Sept. 28, 1954 |
| 2,722,265 | Kelly et al. | Nov. 1, 1955 |
| 2,729,770 | Robbins | Jan. 3, 1956 |
| 2,775,994 | Rowe | Jan. 1, 1957 |
| 2,880,464 | Benedict et al. | Apr. 7, 1959 |
| 2,917,781 | Petry | Dec. 22, 1959 |

FOREIGN PATENTS

| | | |
|---|---|---|
| 649,043 | Great Britain | Jan. 17, 1951 |